(12) United States Patent
Ladhani et al.

(10) Patent No.: US 12,519,426 B2
(45) Date of Patent: Jan. 6, 2026

(54) INTEGRATED POWER AMPLIFIER WITH BIAS CONTROL AND HARMONIC TERMINATION

(71) Applicant: Axiro Semiconductor Inc., San Diego, CA (US)

(72) Inventors: Hussain Hasanali Ladhani, San Diego, CA (US); Ramanujam Srinidhi Embar, San Diego, CA (US)

(73) Assignee: Axiro Semiconductor Inc., San Diego, CA (US)

( * ) Notice: Subject to any disclaimer, the term of this patent is extended or adjusted under 35 U.S.C. 154(b) by 283 days.

(21) Appl. No.: 17/556,181

(22) Filed: Dec. 20, 2021

(65) Prior Publication Data

US 2023/0198469 A1     Jun. 22, 2023

(51) Int. Cl.
*H03F 1/02* (2006.01)
*H01P 5/16* (2006.01)
*H03F 3/24* (2006.01)
*H04B 1/04* (2006.01)

(52) U.S. Cl.
CPC ............. *H03F 1/0288* (2013.01); *H01P 5/16* (2013.01); *H03F 3/245* (2013.01); *H04B 1/0475* (2013.01); *H03F 2200/372* (2013.01); *H03F 2200/451* (2013.01)

(58) Field of Classification Search
CPC ...................................................... H04B 17/15
See application file for complete search history.

(56) References Cited

U.S. PATENT DOCUMENTS 11,114,988 B2    9/2021  Kim et al.
2004/0108901 A1  6/2004  Apel et al.
2017/0250666 A1* 8/2017  Whitefield ........... H03H 7/1766

OTHER PUBLICATIONS

Murao Yoji et al: "An Efficiency and Size Optimized 2GHz 25W Cascaded Doherty RF Power Amplifiers Using GaN HEMTs" 978-1-4799-0586-6/13 2013, IEEE, 4 pages.
Chun S H et al: "Inverted asymmetric Doherty power amplifier driven by two-stage symmetric Doherty amplifier", Electronics Letters, Aug. 19, 2020, vol. 46 No.17, 2 pages.

(Continued)

*Primary Examiner* — Hsinchun Liao
(74) *Attorney, Agent, or Firm* — Sterne, Kessler, Goldstein & Fox P.L.L.C.

(57) ABSTRACT

Apparatuses and systems implementing an amplifier module are described. The amplifier module can include a substrate. A driver amplifier die, a splitter network, an output amplifier die, a bias controller, and a combiner network can be coupled to the substrate. The driver amplifier die can be configured to receive an input radio frequency (RF) signal. The splitter network can be configured to split an intermediate RF signal outputted from the driver amplifier die into first and second RF signals. The output amplifier die can be configured to receive the first and second RF signals. The bias controller can be configured to bias the driver amplifier die and the output amplifier die. The combiner network can be configured to combine first and second outputs of the output amplifier die to generate an output RF signal and terminate at least one harmonic of the output amplifier die's output impedance.

17 Claims, 6 Drawing Sheets

(56) References Cited

OTHER PUBLICATIONS

Rafael-Valdivia Guillermo et al: "Design of a Doherty Power Amplifier with GaN Technology in the Sub-6 GHz Band for 5G Applications with Harmonic Suppression" 2020 IEEE MTT-S Latin America Microwave Conference (LAMC 2020), Nov. 11, 2021, 4 pages.
Jeonghyeon Cha et al: "An adaptive bias controlled power amplifier with a load modulated combining scheme for high efficiency and linearity",IEEE MTT-S International Microwave Symposium Digest, 2003, Jul. 15, 2003. 4 pages.
Extended European Search Report dated May 16, 2023 received in European Patent Application No. EP 2214285.3.

* cited by examiner

INTEGRATED POWER AMPLIFIER WITH BIAS CONTROL AND HARMONIC TERMINATION

TECHNICAL FIELD

The present disclosure relates in general to apparatuses and systems for wireless power amplification. In particular, the present disclosure relates to a multi-chip radio frequency (RF) power amplifier module integrated with bias control and harmonic termination.

BACKGROUND

Wireless communication systems may employ power amplifiers for increasing the power of radio frequency (RF) signals. In a wireless communication system, a power amplifier in a final amplification stage of a transmission channel may facilitate amplification of a signal to an antenna for radiation over the air. High gain, high linearity, stability, and a high level of power-added efficiency are characteristics of a desirable amplifier in such a wireless communication system. In general, a power amplifier may operate at maximum power efficiency when the power amplifier transmits close to saturated power. However, power efficiency may degrade as output power decreases. Therefore, a high efficiency power amplifier architecture may be desirable for current and next-generation wireless systems.

However, various architectures face challenges in terms of semiconductor package design. For example, some amplifier semiconductor package designs may need distinct sets of discrete components such as devices, conductors, and integrated circuits to implement each amplification path. These distinct sets of discrete components may be maintained at specific distances apart from one another to limit potential performance degradation that may occur due to signal coupling between the different amplification paths. Therefore, it may be a challenge to design a power amplifier of a relatively small size while maintaining a distance between the different amplification paths.

SUMMARY

In an embodiment, an apparatus implementing an amplifier module is generally described. The apparatus can include a driver amplifier stage configured to receive an input radio frequency (RF) signal. The apparatus can further include a splitter network configured to split an intermediate RF signal outputted from the driver amplifier stage into a first RF signal and a second RF signal. The apparatus can further include an output amplifier stage configured to receive the first RF signal and the second RF signal from the splitter network. The apparatus can further include a power management integrated circuit (PMIC) configured to provide bias voltages to the driver amplifier stage and the output amplifier stage. The apparatus can further include a combiner network configured to combine a first output and a second output of the amplifier stage to generate an output RF signal. The combiner network can further be configured to terminate at least one harmonic of an output impedance of the output amplifier stage.

In another embodiment, an amplifier module is generally described. The amplifier module can include a substrate with a mounting surface. The amplifier module can further include a driver amplifier die coupled to the substrate, the driver amplifier die being configured to receive an input radio frequency (RF) signal. The amplifier module can further include a splitter network coupled to the substrate, the splitter network being configured to split an intermediate RF signal outputted from the driver amplifier stage into a first RF signal and a second RF signal. The amplifier module can further include an output amplifier die coupled to the substrate, the output amplifier die being configured to receive the first RF signal and the second RF signal from the splitter network. The amplifier module can further include a power management integrated circuit (PMIC) coupled to the substrate, the PMIC being configured to provide bias voltages to the driver amplifier stage and the output amplifier stage. The amplifier module can further include a combiner network coupled to the substrate, the combiner network being configured to combine a first output and a second output of the amplifier stage to generate an output RF signal. The combiner network can be further configured to terminate at least one harmonic of an output impedance of the output amplifier stage.

In another embodiment, a system implementing an amplifier module is generally described. The system can include an antenna and a transmitter coupled to the antenna. The transmitter can include the amplifier module. The amplifier module can include a driver amplifier stage configured to receive an input radio frequency (RF) signal. The amplifier module can further include a splitter network configured to split an intermediate RF signal outputted from the driver amplifier stage into a first RF signal and a second RF signal. The amplifier module can further include an output amplifier stage configured to receive the first RF signal and the second RF signal from the splitter network. The amplifier module can further include a bias controller, which can be a power management integrated circuit (PMIC), configured to provide bias voltages to the driver amplifier stage and the output amplifier stage. The amplifier module can further include a combiner network configured to combine a first output and a second output of the amplifier stage to generate an output RF signal. The combiner network can be further configured to terminate at least one harmonic of an output impedance of the output amplifier stage.

The foregoing summary is illustrative only and is not intended to be in any way limiting. In addition to the illustrative aspects, embodiments, and features described above, further aspects, embodiments, and features will become apparent by reference to the drawings and the following detailed description. In the drawings, like reference numbers indicate identical or functionally similar elements.

DETAILED DESCRIPTION

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

To design a power amplifier with a smaller size, Gallium Nitride (GaN) devices are considered. GaN devices may provide various advantages over devices of other materials, such as providing compact size, higher power density, higher efficiency, lower switching losses, and better thermal management. GaN devices belong to a family of semiconductors known as wide-band-gap semiconductors. Wide-band-gap semiconductors may be referred to as materials with bandgaps significantly greater than those of commonly used materials, such as, for example, silicon (Si) or gallium arsenide (GaAs). A wide bandgap typically refers to a material with bandgap of greater than, for example, 1 or 2 electron volts (eV), and GaN has a bandgap of 3.2 electron volts (eV) (nearly three times higher than that of silicon). The wider bandgap allows GaN devices to require more energy for exciting a valence electron into the conduction band of the semiconductor, providing an advantage of allowing larger breakdown voltages and greater thermal stability at higher temperatures. Further, GaN's higher breakdown voltage allows GaN devices to support high voltage and high-power applications without being damaged, allowing GaN devices to be used in power applications while maintaining a relatively smaller footprint. Therefore, power amplifiers based on GaN devices may have amplification paths that are closer together, resulting in a smaller power amplifier. For radio frequency applications, GaN has an electron mobility that may be significantly higher than, for example, silicon. As a result, the electrons in GaN crystals can move over 30% faster than in silicon. Thus, GaN's electron mobility allows GaN to handle higher switching frequencies in specific applications, such as RF applications.

Figure 1:
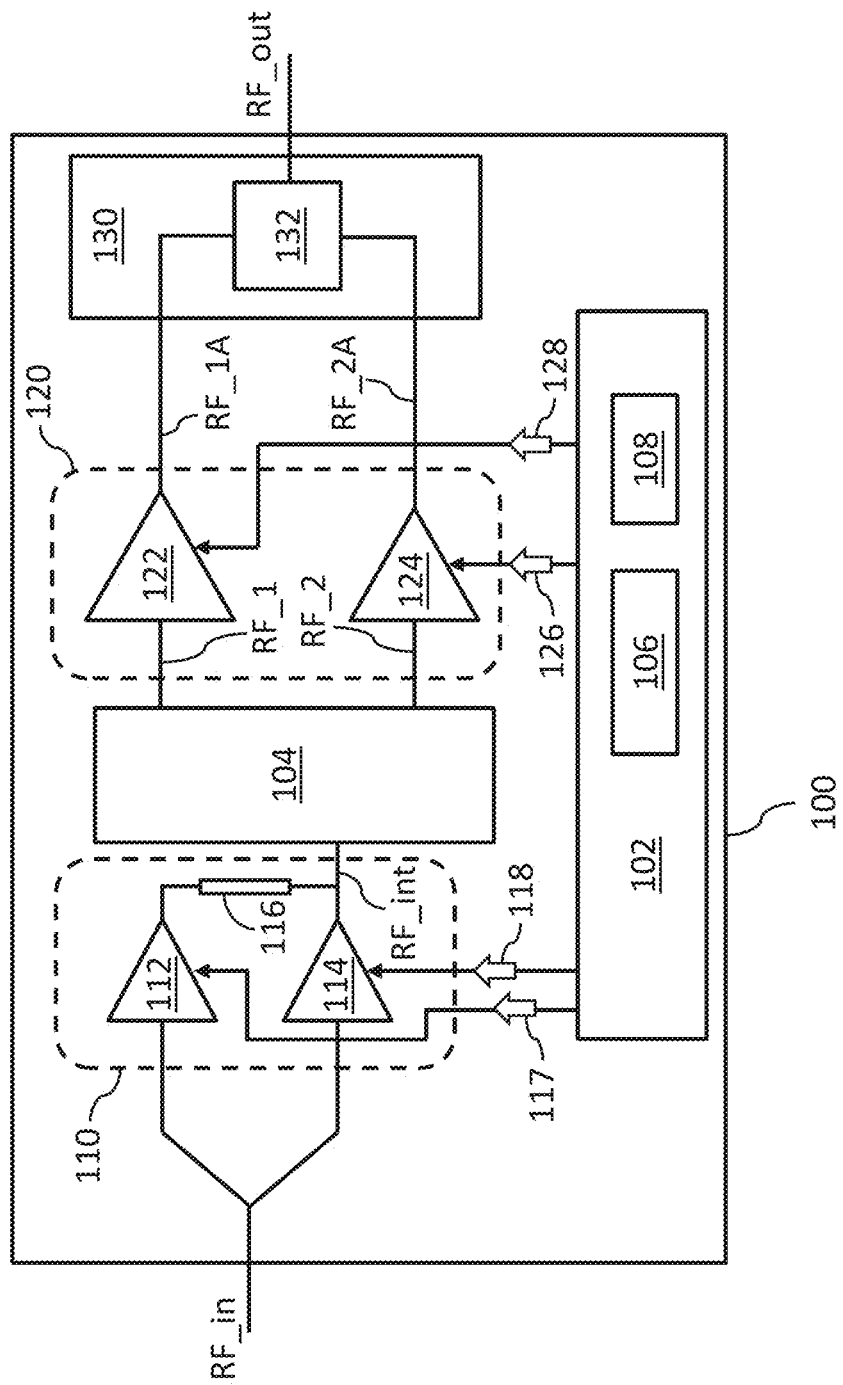
FIG. 1 is a diagram showing an example apparatus that can implement integrated power amplifier with bias control and harmonic termination in one embodiment.

FIG. 1 is a diagram showing an example apparatus 100 that can implement integrated power amplifier with bias control and harmonic termination in one embodiment. Apparatus 100 can be a power amplifier module with multiple components (e.g., chips, die, circuit elements, etc.) integrated in one semiconductor package. Apparatus 100 can include bias controller 102, a driver amplifier stage 110, a splitter network 104, an output amplifier stage 120, and a combiner network 130. Bias controller 102 can be a power management integrated circuit (PMIC). In one embodiment, driver amplifier stage 110 and output amplifier stage 120 can be a 2-way Doherty amplifier. In one or more embodiments, output amplifier stage 120 can be a N-way Doherty amplifier. Apparatus 100 can be configured to receive an input RF signal RF_in, and amplify RF_in to produce an output RF signal RF_out. In one embodiment, driver amplifier stage 110 and output amplifier stage 120 can include Gallium Nitride (GaN) transistors, such as gallium nitride metal semiconductor field-effect transistors (GaN MESFET), GaN high-electron-mobility transistor (HEMT), GaN heterostructure field-effect transistor (HFET), Silicon laterally-diffused metal-oxide semiconductor (LDMOS), Silicon Complementary metal-oxide-semiconductor (CMOS), Gallium Arsenide (GaAs) devices, Silicon Germanium (SiGe), etc.

Driver amplifier stage 110 can include an amplifier 112 and an amplifier 114. Amplifier 112 can be a peaking or auxiliary amplifier of driver amplifier stage 110, and amplifier 114 can be a carrier or main amplifier of driver amplifier stage 110. In one embodiment, amplifiers 112, 114 can be symmetric (e.g., identical, having a same size, and/or having same power capability) radio frequency (RF) amplifiers. Input radio frequency (RF) signal RF_in can be received by apparatus 100 and distributed to amplifiers 112, 114 in driver amplifier stage 110. Amplifiers 112, 114 of driver amplifier stage 110 can receive RF_in, and apply a gain to RF_in to amplify RF_in into an intermediate RF signal RF_int. A matching network including an impedance inverter 116 can be connected between output terminals of amplifiers 112, 114. Impedance inverter 116 can be configured to perform impedance inversion to match an output impedance of driver amplifier stage 110 with an impedance of splitter network 104. The impedance matching performed by impedance inverter 116 can maximize power being transferred from driver amplifier stage 110 to output amplifier stage 120, and/or to prevent generation of standing waves between driver amplifier stage 110 and output amplifier stage 120.

Splitter network 104 can be configured to split intermediate RF signal RF_int into a first RF signal RF_1 and a second RF signal RF_2. Splitter network 104 can include various surface mount passive components (e.g., resistors, inductors, capacitors) that can facilitate splitting of RF signals. In one or more embodiments, splitter network 104 can include transmission lines that can apply specific delays to intermediate RF signal RF_int, such as a quarter wave transmission line that provides a 90-degree phase shift. In one embodiment, splitter network 104 can be implemented using a stripline-based four-port surface mount 90-degree hybrid coupler. In one embodiment, splitter network 104 can have a power split ratio of 1:X such that a voltage level of the ratio of first RF signal RF_1 to second RF signal RF_2 can be 1:X, where X can vary between 1 to 2.

Output amplifier stage 120 can include an amplifier 122 and an amplifier 124. Amplifier 122 can be a peaking or auxiliary amplifier of output amplifier stage 120, and amplifier 124 can be a carrier or main amplifier of output amplifier stage 120. In one embodiment, amplifiers 122, 124 can be asymmetric, such as being different RF amplifiers that have different power capabilities from one another. For example, amplifier 122 can have higher power capability when compared to amplifier 124, such that amplifier 122 can process signals with higher voltage levels and amplifier 124 can process signals with lower voltage signals. First RF signal RF_1 and second RF signal RF_2 can be received by amplifiers 122, 124 of output amplifier stage 120, respectively. Amplifier 122 can apply a gain to RF_1 to amplify RF_1 to produce a RF signal RF_1A, where RF_1A can be an amplified version of RF_1. Amplifier 124 can apply a gain to RF_2 to amplify RF_2 to produce a RF signal RF_2A, where RF_2A can be an amplified version of RF_2.

Bias controller 102 can be configured to provide gate bias voltages 117, 118 to switch on amplifiers 112, 114, respectively. Amplifiers 112, 114 can be switched on simultaneously or at different times, depending on a voltage level of input RF signal RF_in. Bias controller 102 can also be configured to provide a gate bias voltage 126 to amplifier 122, and a gate bias voltage 128 to amplifier 124. Amplifiers 122, 124 can be switched on simultaneously or at different times, depending on a voltage level of intermediate RF signal RF_int. Bias controller 102 can be further configured to monitor various parameters of apparatus 100 and adjust bias voltages or other parameters or control signals internal to apparatus 100 based on the monitored parameters. For example, bias controller 102 can include a temperature sensor 108 configured to sense an operating temperature of apparatus 100. A controller 106 (e.g., a microcontroller) of bias controller 102 can be configured to adjust gate bias voltages 117, 118, 126, 128, based on the operating temperature sensed by temperature sensor 108.

In one embodiment, apparatus 100 can be a power amplifier module integrated in a RF communication device such as a radio transmitter, radio transceiver, a beamformer circuit, and/or other types of RF communication devices that requires RF signal amplification. An output terminal of apparatus 100 can be connected to a load or a device that can emit radio waves representing output RF signal RF_out, such as an antenna or one or more antennas among a phased array. Combiner network 130 can include an impedance inverter 132 connected between output terminals of amplifiers 122, 124. Impedance inverter 132 can be configured to perform impedance inversion to match an output impedance of output amplifier stage 120 with a load or input impedance of a load drawing power from apparatus 100. Specifically, impedance inverter 132 can provide second harmonic terminations to optimize operations of amplifier 124. The impedance matching performed by impedance inverter 132 can maximize power being transferred from output amplifier stage 120 to the load, and/or to prevent generation of standing waves between output amplifier stage 120 and the load.

Combiner network 130 can be designed to satisfy criteria for bandwidth, efficiency, load modulation, and perform second and third harmonic terminations. Bias controller 102, driver amplifier stage 110, splitter network 104, output amplifier stage 120, and combiner network 130, can be integrated inside a single multi-chip module having a relatively compact size. For example, apparatus 100 can be fit on a substrate or wafer having dimensions of approximately 12 millimeters (mm)×8 mm. The implementation of an integrated Doherty amplifier in output amplifier stage 120 can reduce an amount of occupied board space, while accommodating relatively wide RF bandwidth, when compared with other types of amplifiers. For example, the implementation of the Doherty amplifier allows combiner network 130 to use a 90-degree impedance inverter (e.g., impedance inverter 132) connected between outputs of amplifiers 122, 124 and an off-state delay line on the output of peaking amplifier (e.g., amplifier 122) may not be needed. Further, impedance inverter 132 can be realized or implemented by a lumped equivalent element circuit (e.g., using resistors, inductors, capacitors), instead of a microstrip line, to preserve board space.

The implementation of an integrated Doherty amplifier in driver amplifier stage 110 can also reduce the amount of occupied board space, when compared with other types of amplifiers such as class AB amplifiers. Further, the implementation of symmetric Doherty amplifier (e.g., amplifiers 112, 114 being identical) in driver amplifier stage 110 can provide optimal linearity across wider bandwidth signals since the driver amplifier stage may operate at back-off power at approximately 10 to 12 decibels (dB). In one embodiment, impedance inverter 116 of driver amplifier stage 110 can also be realized or implemented by lumped equivalent circuit elements (e.g., resistors, inductors, capacitors), instead of a microstrip line, to preserve board space. Further, the impedance inverter 116, along with the implementation of a symmetric Doherty amplifier in driver amplifier stage 110, can provide a 50-Ohm direct combination of RF signals outputted by amplifiers 112, 114, such that an output transformer is not required before the output of driver amplifier stage 110.

The utilization of GaN transistors in driver amplifier stage 110 and output amplifier stage 120, along with the implementation of lumped equivalent for impedance inverter 132, allows driver amplifier stage 110 and output amplifier stage 120 to fit on an area of a substrate that may be relatively small. The reduction of circuit board space occupied by driver amplifier stage 110 and output amplifier stage 120 allows bias controller 102 to be integrated in the same module (e.g., apparatus 100). Integration of bias controller 102 in the same module as driver amplifier stage 110 and output amplifier stage 120 can allow relatively more efficient and faster bias control of driver amplifier stage 110 and output amplifier stage 120, thus improving an overall performance of the power amplifier chip or module (e.g., apparatus 100).

Figure 2:
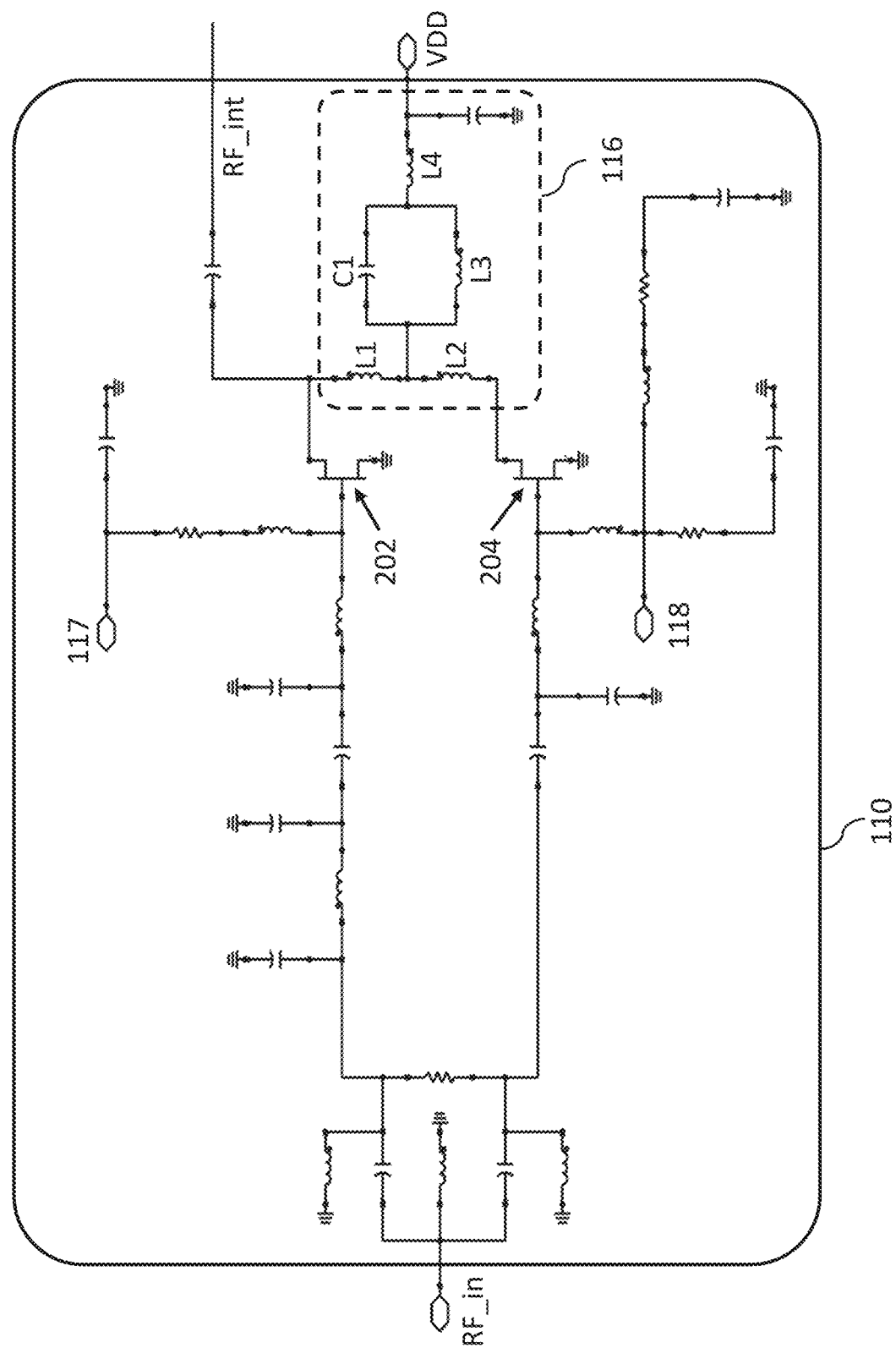
FIG. 2 is a diagram showing additional details of the example apparatus shown in FIG. 1 in one embodiment.

FIG. 2 is a diagram showing additional details of the example apparatus shown in FIG. 1 in one embodiment. In an example shown in FIG. 2, driver amplifier stage 110 can include a transistor 202 and a transistor 204. Transistors 202, 204 can be GaN transistors. Transistor 202 can be a part of amplifier 112 and transistor 204 can be a part of amplifier 114 (see FIG. 1). Transistors 202, 204 can be identical with one another (e.g., having the same size). Gate bias voltages 117, 118 provided by bias controller 102 (see FIG. 1) can switch on transistor 202 and transistor 204, respectively. Impedance inverter 116 can be connected between transistors 202, 204, or between output terminals of amplifiers 112, 114. Impedance inverter 116 can be implemented as lumped components such as chip capacitors and chip inductors, or in the form of distributed transmission lines such as microstrip lines, or in a hybrid form using both lumped and microstrip lines. In the example shown in FIG. 2, impedance inverter 116 can be implemented as a lumped equivalent of a transmission line (an arrangement of circuit elements including a capacitor C1 and inductors L1, L2, L3, L4, as shown in FIG. 2). A size of the components in impedance inverter 116 can be based on the voltage and current levels exercised by circuit elements in impedance inverter 116, and available circuit board space. In one embodiment, sample values for L1 and L2 can be approximately 1.9 nanohenry (nH) if driver amplifier stage operates at approximately 3.5 gigahertz (GHz). A supply voltage VDD can be applied to impedance inverter 116 to drive impedance inverter 116 to perform impedance inversion. In one or more embodiments, supply voltage VDD can be within a range of 20V to 55V. The impedance inversion performed by impedance inverter 116 can match an output impedance of driver amplifier stage 110 with an input impedance of output amplifier stage 120. The impedance matching performed by impedance inverter 116 can maximize power being transferred from driver amplifier stage 110 to output amplifier stage 120. In response to driver amplifier stage 110 being a Doherty amplifier, driver amplifier stage, driver amplifier stage 110 may deliver relatively higher efficiency at backoff power levels. Further impedance inverter 116 can also provide additional features such as providing drain bias feed to supply VDD to transistors 202 and 204. Furthermore, impedance inverter 116 can present optimum harmonic terminations at second and third harmonics at the current generator of transistors 202, 204 to enable high efficiency and higher power density.

Figure 3:
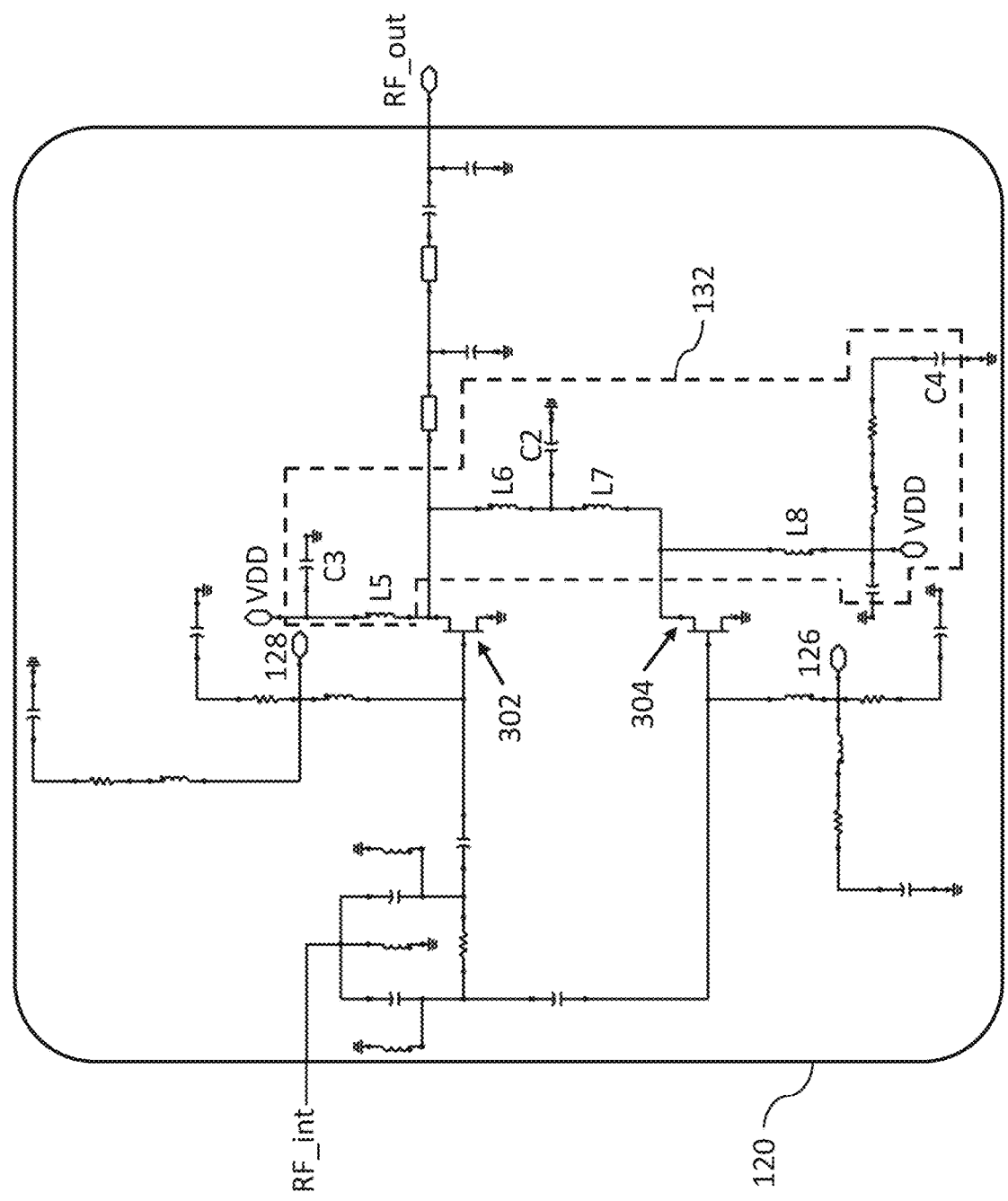
FIG. 3 is a diagram showing additional details of the example apparatus shown in FIG. 1 in one embodiment.

FIG. 3 is a diagram showing additional details of the example apparatus shown in FIG. 1 in one embodiment. In an example shown in FIG. 3, output amplifier stage 120 can include a transistor 302 and a transistor 304. Transistors 302, 304 can be GaN transistors. Transistor 302 can be a part of amplifier 122 and transistor 304 can be a part of amplifier 124 (see FIG. 1). In one or more embodiments, transistor 302 have a size equal to or greater than a size of transistor 304. Gate bias voltage 128 provided by bias controller 102 (see FIG. 1) can switch on transistor 302, and gate bias voltage 128 provided by bias controller 102 (see FIG. 1) can switch on transistor 304. Impedance inverter 132 can be connected between transistors 302, 304, or between output terminals of amplifiers 122, 124. Impedance inverter 132 can be implemented as lumped components such as chip capacitors and chip inductors, or in the form of distributed transmission lines such as microstrip lines, or in a hybrid form using both lumped and microstrip lines. In the example shown in FIG. 2, impedance inverter 132 can be implemented as a lumped equivalent of a transmission line (an arrangement of circuit elements including a capacitor C2 and inductors L5, L6, L7, L8, as shown in FIG. 3). A size of the components in impedance inverter 132 can be based on the voltage and current levels exercised by circuit elements in impedance inverter 132, and available circuit board space. In one embodiment, L6 and L7 can be 0.35 nH, C2 can be 0.3 picofarad (pF), L5 can be 0.85 nH, L8 can be 0.5 nH if final stage operates at approximately 3.5 gigahertz (GHz). In one embodiment, when inductors L5 and L8 have relatively high inductance, inductors L5 and L8 can function as chokes. When inductors L5 and L8 have relatively lower inductance, RF signals (e.g., RF_1, RF_2) may be directed to capacitors C3, C4 and VDD may not see any RF signals. The impedance inversion performed by impedance inverter 132 can match an output impedance of output amplifier stage 120 with a load or input impedance of a load drawing power from apparatus 100. Specifically, impedance inverter 132 can match impedances of second and third harmonics between output amplifier stage 120 and the load connected to apparatus 100. The impedance matching performed by impedance inverter 132 can maximize power being transferred from output amplifier stage 120 to the load. Further, impedance inverter 132 can provide additional features such as providing drain bias feed to supply VDD to transistors 302 and 304. Furthermore, impedance inverter 132 can present optimum harmonic terminations at second and third harmonics at the current generator of transistors 302, 304 to enable high efficiency and higher power density.

Figure 4:
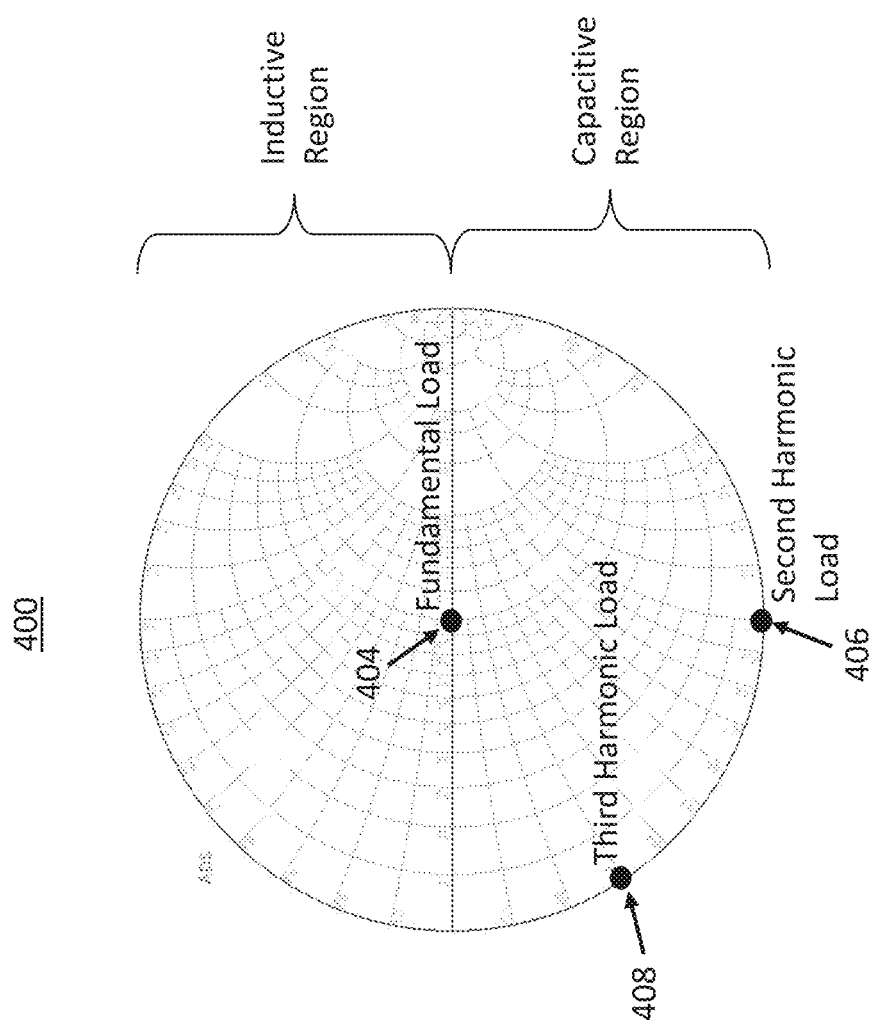
FIG. 4 is a diagram showing an example result of an implementation of the example apparatus shown in FIG. 1 in one embodiment.

FIG. 4 is a diagram showing example results of an implementation of the example apparatus 100 shown in FIG. 1 in one embodiment. A Smith chart 400 scaled for an optimum fundamental impedance of apparatus 100 is shown in FIG. 4. On Smith chart 400, the impedance of a fundamental frequency of input RF signal RF_in is shown at point 404 on Smith chart 400. In an aspect, nonlinearities of active transistors (e.g., transistors 302, 304) can generate harmonics at higher order frequencies. The generated harmonics can be controlled by designing impedance inverter 132 to tailor to the generated harmonics, such that a performance of apparatus 100 can be enhanced. For example, points 406 and 408 in Smith chart 400 depicts the second harmonic and third harmonic impedances presented to transistor 304 (e.g., carrier transistor) at a current generator reference plane. Points 404, 406, 408, can represent target matching impedances for the fundamental frequency, the second harmonic, and the third harmonic, respectively. Points 404, 406, 408 can be used for designing impedance inverter 116 and/or impedance inverter 132 to achieve a voltage swing on transistor 304 to reach approximately three times the supply voltage VDD (e.g., 150V, if VDD is 50V), and allows an approximation of the output to a square waveform. For example, impedance inverter 132 can be designed by fixing points 406, 408 in the capacitive region. The combination of multiplied voltage swing (e.g., three times) and square wave approximation can lead to higher power and higher efficiency when compared to amplifier modules that are designed based on solely matching impedance of the fundamental frequency (e.g., modules where outputs have a sinusoidal voltage waveform and/or a half sinusoidal current waveform).

Impedance matching performed by impedance inverter 132 can adjust the output impedance of output amplifier stage 120 to terminate specific harmonics. For example, in order to terminate second harmonics, the output impedance of output amplifier stage 120 can be adjusted by impedance inverter 132 to achieve an impedance represent by point 406 on Smith chart 400. In order to terminate third harmonics, the output impedance of output amplifier stage 120 can be adjusted by impedance inverter 132 to achieve an impedance represent by point 408 on Smith chart 400. In an aspect, apparatus 100 can terminate second and third harmonics to achieve a relatively significant voltage swing (e.g., more than three times the drain voltage) based on a utilization of GaN transistors.

Figure 5:
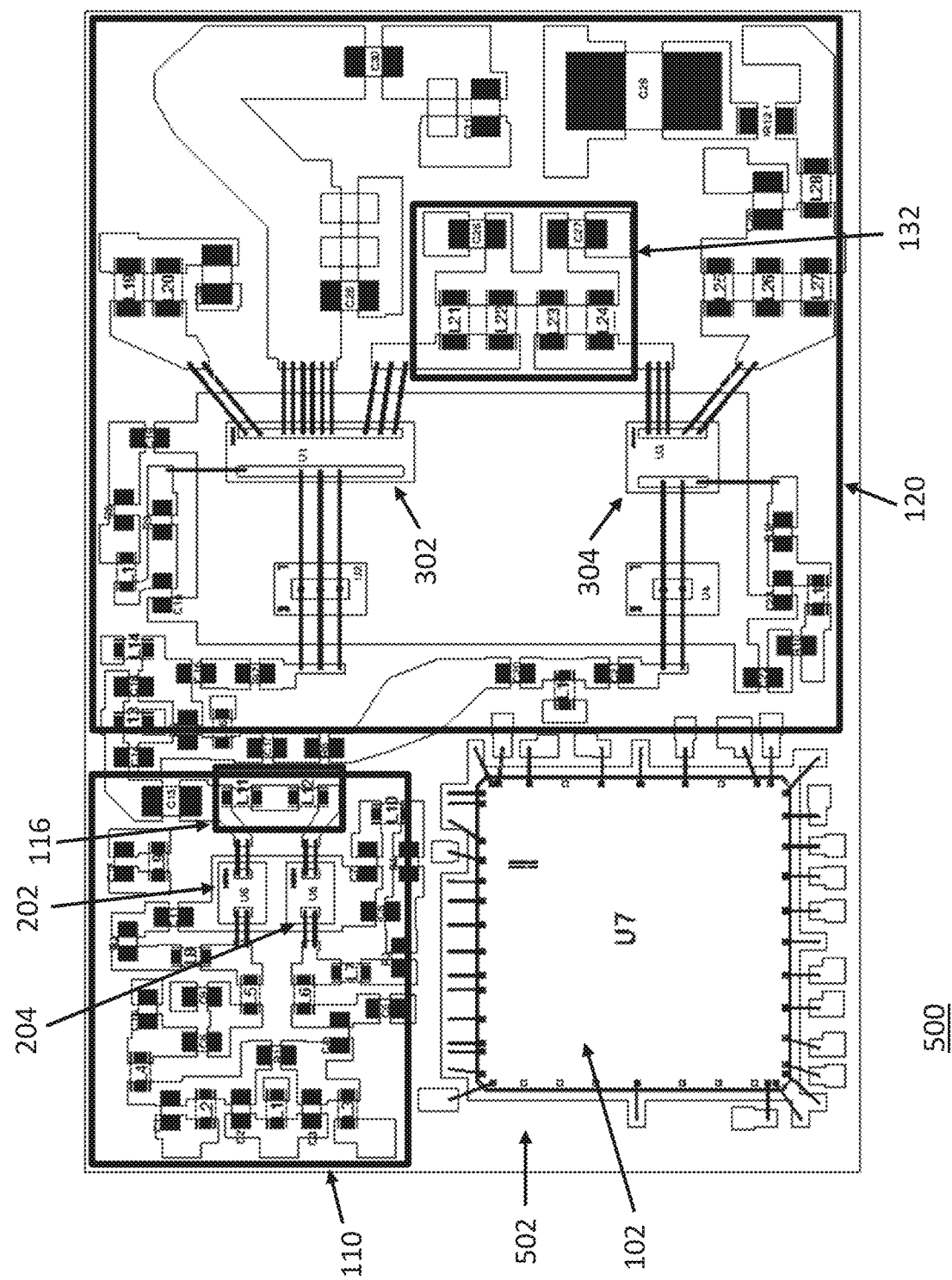
FIG. 5 is a diagram showing a layout of a packaged device that can implement the example apparatus shown in FIG. 1 in one embodiment.

FIG. 5 is a diagram showing a layout of a packaged device that can implement the example apparatus 100 shown in FIG. 1 in one embodiment. A layout 500 of apparatus 100 (see FIG. 1) is shown in FIG. 5. Referring to FIG. 1, driver amplifier stage 110, splitter network 104, output amplifier stage 120, combiner network 130, and bias controller 102 can be coupled to, or mounted on top of, a substrate 502. Substrate 502 can be, for example, a multi-layer laminate including a mounting surface for mounting various circuit components, devices, chips, and/or die. In one embodiment, driver amplifier stage 110 and output amplifier stage may be monolithic integrated circuits (ICs) that may produce heat during operation. Substrate 502 may further include electrically and thermally conductive trenches or slugs connected to driver amplifier stage 110 and output amplifier stage 120 to provide heat sinks and ground reference access. In one or more embodiments, one or more conductive landing pads can be mounted on substrate 502. The one or more conductive landing pads can function as an input and output nodes for apparatus 100 to receive RF_in and output RF_out. Some of the conductive pads can function as input nodes for receiving power from power supplies.

In one embodiment, driver amplifier stage 110 and output amplifier stage 120 can be implemented as individual die on substrate 502. Impedance inverter 116 can be implemented as a lumped element circuit in driver amplifier stage 110. Impedance inverter 132 can be implemented as a lumped element circuit in output amplifier stage 120. In the example shown in FIG. 5, transistors 202, 204 (see FIG. 2) can be identical to one another, and transistor 302 can be larger in size than transistor 304, bias controller 102 can be located in proximity to driver amplifier stage 110 and output amplifier stage 120. Driver amplifier stage 110, output amplifier stage 120, and bias controller 102, may be coupled to separate electrical ground to improve isolation or to suppress noise leakage.

In an aspect, silicon transistors may have more parasitic effects when compared to GaN transistors. Therefore, matching networks and impedance converters for high frequency RF applications using silicon transistors may need more components, and a size of these matching networks may increase with the additional components. On the other hand, GaN transistors have less parasitic and high power density when compared to silicon transistors. These differences allow GaN transistors to be implemented in RF applications, and corresponding matching networks and impedance inverters may be implemented with relatively less components when compared to applications implementing silicon transistors.

Figure 6:
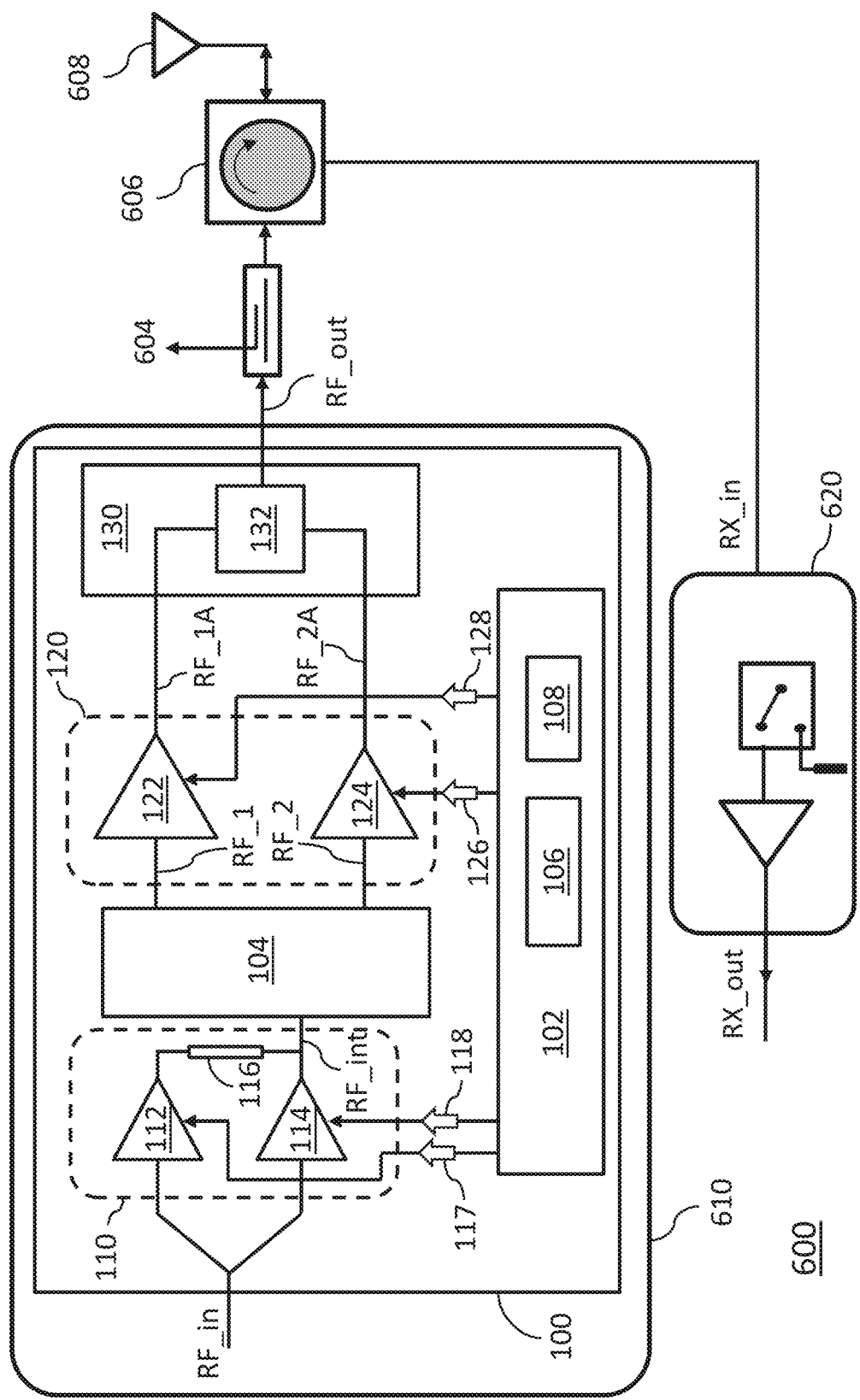
FIG. 6 is a diagram showing an example communication system that can implement integrated power amplifier with bias control and harmonic termination in one embodiment.

FIG. 6 is a diagram showing an example system 600 that can implement integrated power amplifier with bias control and harmonic termination in one embodiment. System 600 may be a communication system implemented in a radio transmitter or transceiver. System 600 may include a transmitter or a transmission channel 610 that includes apparatus 100, a receiver or a receiver channel 620, and one or more antennas 608. Transmitter 610 may be configured to provide input RF signal RF_in to apparatus 100. In one embodiment, transmitter 601 can further include a front-end circuit including control components, such as gain control circuits and phase control circuits that may adjust a gain and phase of the input RF signal RF_in prior to being amplified by apparatus 100. Apparatus 100 can send output RF signal RF_out to antenna 608. In one embodiment, RF_out can be fed back to, for example, transmitter 610 or other controllers, as a feedback signal 604. In one embodiment, system 600 can be connected in a loop with a digital predistortion system that can use feedback signal 604 to monitor RF_out and maintain and stabilize performance of antenna 608. In one embodiment, a circulator 606 can be connected between the output of apparatus 100 and antenna 608. Circulator 606 can prevent damage to antenna 608 by redirecting current flowing to or from antenna 608 in response to a transmit or receiver mode being activated for system 600. In an example, circulator 606 may be switched to connect the output of apparatus 100 to antenna 608 when system 600 is operating in a transmission mode. When system 600 is operating in a receiving mode, circulator 606 may be switched to connect antenna 608 to receiver 620. In the receiving mode, antenna 608 may receive a RF signal labeled as RX_in, and receiver 620 may be configured to process RX_in to determine a phase, receiving angle, amplitude, etc., of RX_in to generate a received RF signal labeled as RX_out. System 600 can further include decoders and combiners that can facilitate decoding messages that may be carried by RF signal RX_out.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus comprising:
   a driver amplifier stage configured to receive an input radio frequency (RF) signal, wherein the driver amplifier stage is implemented by a first Doherty amplifier;
   a splitter network configured to split an intermediate RF signal outputted from the driver amplifier stage into a first RF signal and a second RF signal;
   an output amplifier stage configured to receive the first RF signal and the second RF signal from the splitter network, wherein the output amplifier stage is implemented by a second Doherty amplifier;
   a bias controller configured to provide bias voltages to the driver amplifier stage and the output amplifier stage; and
   a combiner network comprising:
      a circuit comprising two inductors connected in series and a capacitor connected between a junction of the two inductors and ground, wherein the circuit is configured to terminate a second harmonic and a third harmonic of an output from a carrier amplifier of the second Doherty amplifier to generate a first output; and
      a combination node that combines the first output from the circuit with a second output from a peaking amplifier of the second Doherty amplifier to generate an output RF signal.

2. The apparatus of claim 1, wherein:
   the driver amplifier stage comprises a pair of transistors having a same size; and
   the output amplifier stage comprises a pair of transistors having different sizes.

3. The apparatus of claim 1, wherein the driver amplifier stage and the output amplifier stage comprises Gallium Nitride (GaN) transistors.

4. The apparatus of claim 1, wherein:
   the circuit implements an impedance inverter to perform impedance inversion to terminate the second harmonic and the third harmonic of the output from the carrier amplifier.

5. The apparatus of claim 1, wherein the driver amplifier stage comprises a carrier amplifier, a peaking amplifier, and an impedance inverter connected between an output of the carrier amplifier and the output of the driver amplifier stage, the impedance inverter being configured to perform impedance inversion to match an output impedance of the driver amplifier stage with an input impedance of the output amplifier stage.

6. The apparatus of claim 1, wherein the combiner network further comprises:
   a first drain bias feed configured to provide a supply voltage to a drain terminal of the peaking amplifier of the second Doherty amplifier; and
   a second drain bias feed configured to provide a supply voltage to a drain terminal of the carrier amplifier of the second Doherty amplifier.

7. An amplifier module comprising:
   a substrate with a mounting surface;
   a driver amplifier die, the driver amplifier die being configured to receive an input radio frequency (RF) signal;

a splitter network, the splitter network being configured to split an intermediate RF signal outputted from the driver amplifier die into a first RF signal and a second RF signal;

an output amplifier die, the output amplifier die being configured to receive the first RF signal and the second RF signal from the splitter network;

a bias controller, the bias controller being configured to provide bias voltages to the driver amplifier die and the output amplifier die; and a combiner network, the combiner network being configured to:

combine a first output and a second output of the output amplifier die to generate an output RF signal; and terminate a second harmonic and a third harmonic of an output impedance of the output amplifier die using a circuit comprising two inductors connected in series and a capacitor connected between a junction of the two inductors and ground, wherein the driver amplifier die, the splitter network, the output amplifier die, the bias controller and the combiner network are mounted on the mounting surface of the substrate.

8. The amplifier module of claim 7, wherein:

the driver amplifier die comprises a pair of transistors having a same size; and the output amplifier die comprises a pair of transistors having different sizes.

9. The amplifier module of claim 7, wherein the driver amplifier die and the output amplifier die comprise Gallium Nitride (GaN) transistors.

10. The amplifier module of claim 7, wherein:

the output amplifier die comprises a carrier amplifier and a peaking amplifier; and the circuit is an impedance inverter connected between an output of the carrier amplifier and the output of the peaking amplifier, the impedance inverter being configured to terminate the second harmonic and the third harmonic of the output impedance of the output amplifier die.

11. The amplifier module of claim 7, wherein the driver amplifier die comprises a carrier amplifier, a peaking amplifier, and an impedance inverter connected between an output of the carrier amplifier and the output of the driver amplifier die, the impedance inverter being configured to perform impedance inversion to match an output impedance of the driver amplifier die with an input impedance of the output amplifier die.

12. The amplifier module of claim 7, wherein the driver amplifier die and the output amplifier die are Doherty amplifiers.

13. A system comprising:

an antenna;

a transmitter coupled to the antenna, wherein the transmitter comprises an amplifier module, and wherein the amplifier module comprises:

a driver amplifier stage configured to receive an input radio frequency (RF) signal;

a splitter network configured to split an intermediate RF signal outputted from the driver amplifier stage into a first RF signal and a second RF signal;

an output amplifier stage configured to receive the first RF signal and the second RF signal from the splitter network;

a bias controller configured to provide bias voltages to the driver amplifier stage and the output amplifier stage; and a combiner network configured to:

combine a first output and a second output of the output amplifier stage to generate an output RF signal; and terminate a second harmonic and a third harmonic of an output impedance of the output amplifier stage using a circuit comprising two inductors connected in series and a capacitor connected between a junction of the two inductors and ground, wherein the driver amplifier stage, the splitter network, the output amplifier stage, the bias controller and the combiner network are mounted on a same substrate.

14. The system of claim 13, wherein the driver amplifier stage and the output amplifier stage comprise Gallium Nitride (GaN) transistors.

15. The system of claim 13, wherein:

the output amplifier stage comprises a carrier amplifier and a peaking amplifier; and the circuit is an impedance inverter connected between an output of the carrier amplifier and the output of the peaking amplifier, the impedance inverter being configured to terminate the second harmonic and the third harmonic of the output impedance of the output amplifier stage.

16. The system of claim 13, wherein the driver amplifier stage comprises a carrier amplifier, a peaking amplifier, and an impedance inverter connected between an output of the carrier amplifier and the output of the driver amplifier stage, the impedance inverter being configured to perform impedance inversion to match an output impedance of the driver amplifier stage with an input impedance of the output amplifier stage.

17. The system of claim 13, wherein the driver amplifier stage and the output amplifier stage are Doherty amplifiers.

* * * * *